US010606704B1

(12) United States Patent
Chepel et al.

(10) Patent No.: US 10,606,704 B1
(45) Date of Patent: Mar. 31, 2020

(54) CREATION OF CONSISTENT COPIES OF APPLICATION DATA

(71) Applicant: Acronis International GmBh, Shaffhausen (CH)

(72) Inventors: Dmitry Chepel, Moscow (RU); Stanislav Protasov, Moscow (RU); Serguei M. Beloussov, Costa del Sol (SG)

(73) Assignee: ACRONIS INTERNATIONAL GMBH, Shaffhausen (CH)

( * ) Notice: Subject to any disclaimer, the term of this patent is extended or adjusted under 35 U.S.C. 154(b) by 190 days.

(21) Appl. No.: 14/965,288

(22) Filed: Dec. 10, 2015

Related U.S. Application Data (60) Provisional application No. 62/098,437, filed on Dec. 31, 2014.

(51) Int. Cl.
| G06F 16/00 | (2019.01) |
| G06F 11/14 | (2006.01) |
| G06F 9/455 | (2018.01) |

(52) U.S. Cl.
CPC ...... *G06F 11/1448* (2013.01); *G06F 9/45558* (2013.01); *G06F 11/1464* (2013.01); *G06F 2009/45562* (2013.01); *G06F 2201/815* (2013.01); *G06F 2201/84* (2013.01)

(58) Field of Classification Search
CPC ......... G06F 17/30159; G06F 17/30156; G06F 11/148; G06F 11/1464; G06F 9/45533; G06F 12/16; G06F 2009/45583; G06F 9/45558; G06F 9/45562; G06F 2201/815; G06F 2201/84; G06F 11/1451; G06F 11/469; G06F 9/5072; G06F 11/1448
See application file for complete search history.

(56) References Cited

U.S. PATENT DOCUMENTS

| 7,047,380 | B2 | 5/2006 | Tormasov et al. |
| 7,246,211 | B1 | 7/2007 | Beloussov et al. |
| 7,275,139 | B1 | 9/2007 | Tormasov et al. |
| 7,281,104 | B1 | 10/2007 | Tsypliaev et al. |
| 7,318,135 | B1 | 1/2008 | Tormasov et al. |
| 7,353,355 | B1 | 4/2008 | Tormasov et al. |
| 7,366,859 | B2 | 4/2008 | Per et al. |
| 7,475,282 | B2 | 1/2009 | Tormasov et al. |
| 7,603,533 | B1 | 10/2009 | Tsypliaev et al. |
| 7,636,824 | B1 | 12/2009 | Tormasov |
| 7,650,473 | B1 | 1/2010 | Tormasov et al. |
| 7,721,138 | B1 * | 5/2010 | Lyadvinsky ........ G06F 11/1417 714/10 |

(Continued)

*Primary Examiner* — Anh Ly
(74) *Attorney, Agent, or Firm* — K&L Gates LLP (57) ABSTRACT

A method, computer program product, computing system, and system for backing up a virtual machine by creating consistent copies of application data are described. The method may include creating a snapshot of a virtual machine running on a host system. The method may further include determining if the snapshot has a snapshot ID and creating the snapshot ID if the snapshot does not have the snapshot ID. The method may also include creating a virtual machine restoration script configured to roll back the virtual machine to a state corresponding to the snapshot based on the snapshot ID. The method may additionally include backing up the host system in a backup archive while the virtual machine continues operating.

10 Claims, 6 Drawing Sheets

(56) References Cited

U.S. PATENT DOCUMENTS

| | | | |
|---|---|---|---|
| 7,779,221 B1 | 8/2010 | Tormasov et al. | |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,364,639 B1 * | 1/2013 | Koryakina | G06F 11/1458 707/639 |
| 8,484,427 B1 | 7/2013 | Lyadvinsky et al. | |
| 8,645,748 B1 | 2/2014 | Chepel et al. | |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 9,471,441 B1 * | 10/2016 | Lyadvinsky | G06F 11/1464 707/822 |
| 9,524,215 B1 * | 12/2016 | Khandelwal | G06F 11/1446 |
| 9,535,907 B1 * | 1/2017 | Stringham | G06F 16/2308 |
| 9,740,571 B1 * | 8/2017 | Chopra | G06F 11/1461 |
| 2006/0225065 A1 | 10/2006 | Chandhok et al. | |
| 2007/0239804 A1 * | 10/2007 | Armstrong | G06F 11/1438 714/E11.137 |
| 2007/0244938 A1 * | 10/2007 | Michael | G06F 11/1458 714/E11.121 |
| 2008/0229142 A1 * | 9/2008 | Anand | G06F 11/1438 714/6.12 |
| 2009/0313503 A1 * | 12/2009 | Atluri | G06F 11/1453 714/19 |
| 2010/0011178 A1 * | 1/2010 | Feathergill | G06F 11/1466 711/162 |
| 2010/0250499 A1 * | 9/2010 | McAlister | G06F 11/1451 707/679 |
| 2010/0299309 A1 * | 11/2010 | Maki | G06F 11/1479 707/640 |
| 2011/0161299 A1 * | 6/2011 | Prahlad | G06F 9/4856 707/649 |
| 2012/0144391 A1 * | 6/2012 | Ueda | G06F 9/45558 718/1 |
| 2013/0073513 A1 * | 3/2013 | Kemper | G06F 17/30587 707/600 |
| 2013/0154533 A1 * | 6/2013 | Lee | G01M 13/02 318/490 |
| 2013/0332771 A1 * | 12/2013 | Salapura | G06F 11/1415 714/15 |
| 2014/0006357 A1 * | 1/2014 | Davis | G06F 11/1464 707/667 |
| 2014/0006465 A1 * | 1/2014 | Davis | G06F 16/182 707/827 |
| 2014/0149354 A1 * | 5/2014 | Chan | G06F 9/455 707/639 |
| 2014/0189685 A1 * | 7/2014 | Kripalani | G06F 9/45533 718/1 |
| 2015/0066857 A1 * | 3/2015 | Dayal | G06F 16/128 707/639 |
| 2015/0082303 A1 * | 3/2015 | Bell | G06F 9/45533 718/1 |
| 2015/0161151 A1 * | 6/2015 | Koryakina | G06F 17/30088 711/114 |
| 2016/0042090 A1 * | 2/2016 | Mitkar | G06F 11/1448 707/649 |
| 2016/0110268 A1 * | 4/2016 | Sekiguchi | G06F 12/023 714/15 |
| 2018/0113623 A1 * | 4/2018 | Sancheti | G06F 9/45558 |

* cited by examiner

CREATION OF CONSISTENT COPIES OF APPLICATION DATA

CROSS-REFERENCE TO RELATED APPLICATIONS

This application claims priority to and the benefit of U.S. Provisional Patent Application No. 62/098,437 filed on Dec. 31, 2014, the disclosure of which IS herein incorporated by reference in its entirety.

TECHNICAL FIELD

The technical field may generally relate to virtualization, and more particularly to backing up and restoring virtual machines.

BACKGROUND

Various business critical applications may be run on virtual machines and thus it may be critical to create backups of such virtual machines in case a failure or loss of data occurs. Backing up a virtual machine may consume valuable resources and may cause the virtual machine to run slower or become unstable. In some situations, backups may fail and troubleshooting may be complicated. A virtual machine restored from an unstable or failed backup may include inconsistent data. Thus, there may be a need for more stable and reliable backup processes.

BRIEF SUMMARY

In an embodiment, a method for backing up a virtual machine by creating consistent copies of application data may include creating a snapshot of a virtual machine running on a host system. The method may further include determining if the snapshot has a snapshot ID and creating the snapshot ID if the snapshot does not have the snapshot ID. The method may also include creating a virtual machine restoration script configured to roll back the virtual machine to a state corresponding to the snapshot based on the snapshot ID. The method may additionally include backing up the host system in a backup archive while the virtual machine continues operating.

One or more of the following features may be included. The method may include transferring the backup archive to a storage server. The method may further include excluding changes to the virtual machine written to a service file during backup of the host system after the snapshot was created from the backup archive. The method may also include deleting the virtual machine restoration script from the host system.

In an embodiment, a computer program product may reside on a computer readable storage medium and may have a plurality of instructions stored on it. When executed by a processor, the instructions may cause the processor to perform operations for backing up a virtual machine by creating consistent copies of application data. The operations may include creating a snapshot of a virtual machine running on a host system. The operations may further include determining if the snapshot has a snapshot ID and creating the snapshot ID if the snapshot does not have the snapshot ID. The operations may also include creating a virtual machine restoration script configured to roll back the virtual machine to a state corresponding to the snapshot based on the snapshot ID. The operations may additionally include backing up the host system in a backup archive while the virtual machine continues operating.

One or more of the following features may be included. The operations may include transferring the backup archive to a storage server. The operations may further include excluding changes to the virtual machine written to a service file during backup of the host system after the snapshot was created from the backup archive. The operations may also include deleting the virtual machine restoration script from the host system.

In an embodiment a computing system for backing up a virtual machine by creating consistent copies of application data may include one or more processors. The one or more processors may be configured to create a snapshot of a virtual machine running on a host system. The one or more processors may be further configured to determine if the snapshot has a snapshot ID and creating the snapshot ID if the snapshot does not have the snapshot ID. The one or more processors may also be configured to create a virtual machine restoration script configured to roll back the virtual machine to a state corresponding to the snapshot based on the snapshot ID. Additionally, the one or more processors may be configured to back up the host system in a backup archive while the virtual machine continues operating.

One or more of the following features may be included. The one or more processors may be configured to transfer the backup archive to a storage server. The one or more processors may also be configured to exclude changes to the virtual machine written to a service file during backup of the host system after the snapshot was created from the backup archive. The one or more processors may additionally be configured to delete the virtual machine restoration script from the host system.

In an embodiment, a method for restoring a virtual machine from a backup with consistent copies of application data may include restoring a host system from a backup archive. The method may further include rebooting the host system. The method may also include, after rebooting the host system and before running a virtual machine hosted by the host system, running a restoration script configured to roll back the virtual machine to a state corresponding to a snapshot based on a snapshot ID. The method may additionally include running the virtual machine on the host system.

In an embodiment, a system for backing up a virtual machine by creating consistent copies of application data may include a host system hosting a virtual machine. The system may further include a restoration script configured to roll back the virtual machine to a state corresponding to a snapshot based on a snapshot ID. The system may also include a backup archive at a storage server.

The details of one or more implementations are set forth in the accompanying drawings and the description below. Other features and advantages will become apparent from the description, the drawings, and the claims.

DETAILED DESCRIPTION

Overview

A cloud provider or virtualization administrator may institute backup and recovery procedures to ensure persistence of a tenant's applications, data, or other resources accessed through one or more virtual machines ("VM"). For example, a backup archive of the VM may be created and stored onsite or offsite and may include the entire content of the VM before it failed.

Depending on the applications it is running and the transactions it is performing, a given VM's state may change over time. Virtualization software (e.g., in a vSphere or other virtualization environment) may include features by which snapshots can be taken of the VM to capture its state at a point in time. The snapshot records the state of the VM so that it can be reverted to at a later time. The snapshot can include the state of the disks or other storage associated with the VM and other state features such as whether it is on, off, or suspended. The snapshot may be created for a point in time and all subsequent write operations may then be sent to memory storage such as a virtual disk associated with the VM.

In some situations, a snapshot feature may be used to create a backup of the VM. The snapshot feature may halt any changes to a virtual disk (i.e., the virtual disk that stores all the VM contents) such that the virtual disk may be copied for backup. Any changes attempted to be made to the virtual disk while the virtual disk is being copied for backup may be written to a snapshot file. Thus, the virtual disk can be backed up during a time when its content does not change.

In some situations, an issue with a backup and restore process of a host system with live data (e.g., working virtual machines) may exist. Providing a consistent backup of working application when a snapshot backup is impossible may be desired. An implementation may be based on backing up Parallels Desktop virtual machines which may be run on a host machine or system working under a Mac OS operating system.

In some situations, when a system backup of computer is performed (e.g., backup all data including operating system and working application) a snapshot backup cannot be used. Sometimes it maybe impossible to use snapshots for a system backup. For example it may be impossible for machines working under a Mac OS to use snapshots because there are no ways to make a snapshot of a Mac OS file system. A backup of computer working under a Mac OS operating system may not allow for snapshot backups and only a file backup may be available.

For example, a user may work with his/her Mac computer, where at least one instance of a Parallels Desktop virtual machine is running. A backup application may perform a file backup of this computer in background mode (e.g., a virtual machine is not suspended during the backup). After restoration, the state of the virtual machine becomes inconsistent, and the VM does not work and cannot be run.

Snapshotless backups may not preserve the data of working applications like virtual machines, databases etc. Since a backup process may take significant time, the data backed up with a snapshotless backup (e.g., a file backup) may change between the starting and finishing of the backup.

Using the techniques and features described in the present disclosure, a solution may be provided for this type of situation where, for example, a Parallels Desktop platform or any other virtual platform, including VMWare Fusion (i.e., an application working with Mac OS) is involved. A consistent backup and restore may be performed in situations where we a snapshot backup cannot be used.

Figure 1:
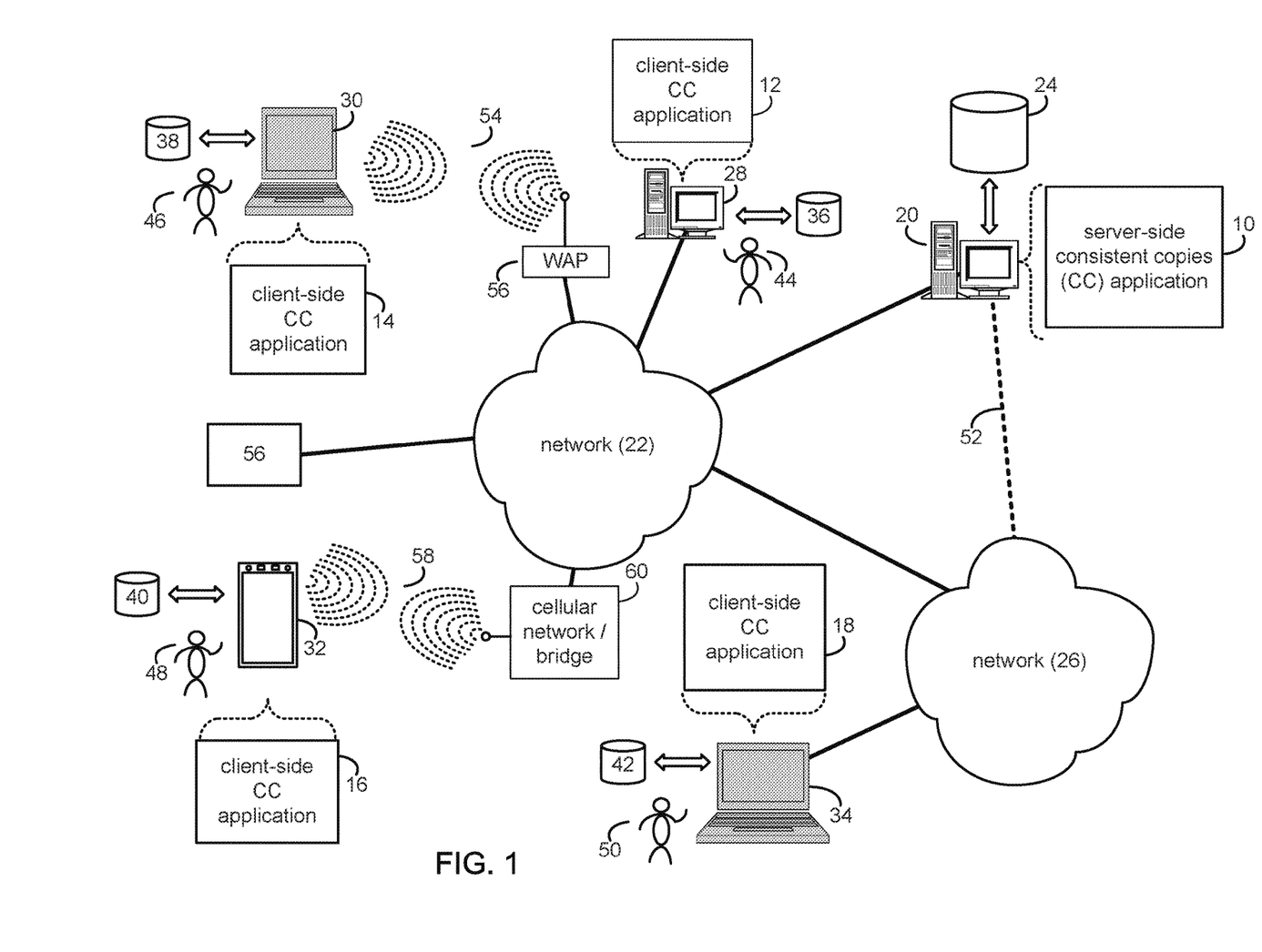
FIG. 1 depicts an example system that can execute implementations of the present disclosure.
Figure 3:
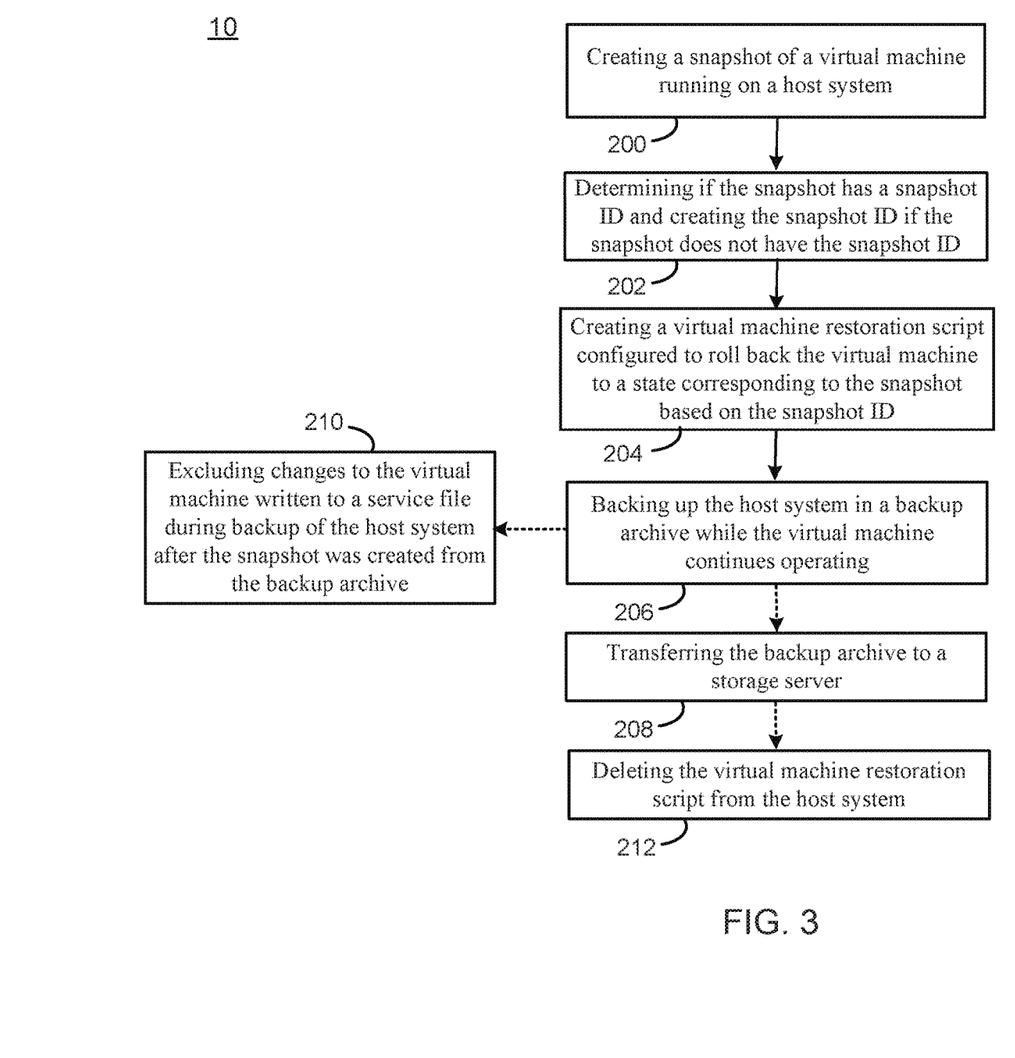
FIG. 3 is a flowchart illustrating an example process for backing up a virtual machine by creating consistent copies of application data in accordance with the present disclosure.

Referring to FIGS. 1 & 3, there is shown a server-side consistent copies (CC) application 10 and client-side CC applications 12, 14, 16, and 18. Server-side CC application 10 and/or one or more of client-side CC applications 12, 14, 16, and/or 18 may execute one or more processes configured to carry out one or more of the features described herein. Server-side CC application 10 may be referred to as a process configured to carry out one or more of the features described herein, such as CC process 10. Further, one or more of client-side CC applications 12, 14, 16, and 18 may be referred to as a process configured to carry out one or more of the features described herein, such as CC processes 12, 14, 16, and/or 18.

As will be discussed below, CC process 10 may create 200 a snapshot of a virtual machine running on a host system. CC process 10 may also determine 202 if the snapshot has a snapshot ID and creating the snapshot ID if the snapshot does not have the snapshot ID. CC process 10 may further create 204 a virtual machine restoration script configured to roll back the virtual machine to a state corresponding to the snapshot based on the snapshot ID. CC process 10 may additionally back up 206 the host system in a backup archive while the virtual machine continues operating. Moreover, CC process 10 may transfer 208 the backup archive to a storage server. CC process 10 may also exclude 210 changes to the virtual machine written to a service file during backup of the host system after the snapshot was created from the backup archive. Further, CC process 10 may delete 212 the virtual machine restoration script from the host system.

The CC process may be a server-side process (e.g., server-side CC process 10), a client-side process (e.g., client-side CC process 12, client-side CC process 14, client-side CC process 16, or client-side CC process 18), or a hybrid server-side/client-side process (e.g., a combination of server-side CC process 10 and one or more of client-side CC processes 12, 14, 16, 18).

System Overview

Referring to FIG. 1, server-side CC process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines (e.g., a virtual machine or virtualization host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side CC process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side CC processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side CC processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side CC processes 12, 14, 16, 18 and/or server-side CC process 10 may be processes that run within (i.e., are part of) a cloud computing site, cloud computing application, cloud platform, or cloud environment. Alternatively, client-side CC processes 12, 14, 16, 18 and/or server-side CC process 10 may be stand-alone applications that work in conjunction with the cloud computing site, cloud computing application, cloud platform, or cloud environment. One or more of client-side CC processes 12, 14, 16, 18 and server-side CC process 10 may interface with each other (via network 22 and/or network 26).

Users 44, 46, 48, 50 may access server-side CC process 10 directly through the device on which the client-side CC process (e.g., client-side CC processes 12, 14, 16, 18) is executed, namely client electronic devices 28, 30, 32, 34, for example. Users 44, 46, 48, 50 may access server-side CC process 10 directly through network 22 and/or through secondary network 26. Further, server computer 20 (i.e., the computer that executes server-side CC process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

CC Process

For the following discussion, server-side CC process 10 will be described for illustrative purposes. It should be noted that server-side CC process 10 may interact with client-side CC process 12 and may be executed within one or more applications that allow for communication with client-side CC process 12. However, this is not intended to be a limitation of this disclosure, as other configurations are possible (e.g., stand-alone, client-side CC processes and/or stand-alone server-side CC processes). For example, some implementations may include one or more of client-side CC processes 12, 14, 16, 18 in place of or in addition to server-side CC process 10.

The systems and methods (e.g., CC process 10) described herein relate to the backup of data in a virtualized environment (e.g., vSphere environment 64). The systems described herein may include one or more memory elements for backup of software and databases, virtual machines, and computer storage products including instructions to be executed by a processor to cause the processor to implement the methods described herein. The systems described herein may also include a backup archive, where the VM backup file, backup archive file, or backup contents may be located; the backup archive may be disposed in a memory, a portion of a memory, or across one or more memories Referring now to FIG. 1, one or more of users 44, 46, 48, and 50 may be cloud or virtualization administrators at a cloud or virtualization provider or may be cloud or virtualization end-users. The cloud or virtualization administrators may access and administer a cloud or virtualization computing site and the end users may access and interact with the computing site through one or more of client electronic devices 28, 30, 32, 34 (respectively). The computing site may run a cloud or virtualization application such as VMWare™ or may include bare-metal embedded hypervisors (e.g., VMware™ ESX™ and VMware™ ESXi™) that may run directly on server hardware at computing site 20. Further, the computing site may include a vCloud™ architecture that may enhance cooperation between hypervisors.

Figure 2:
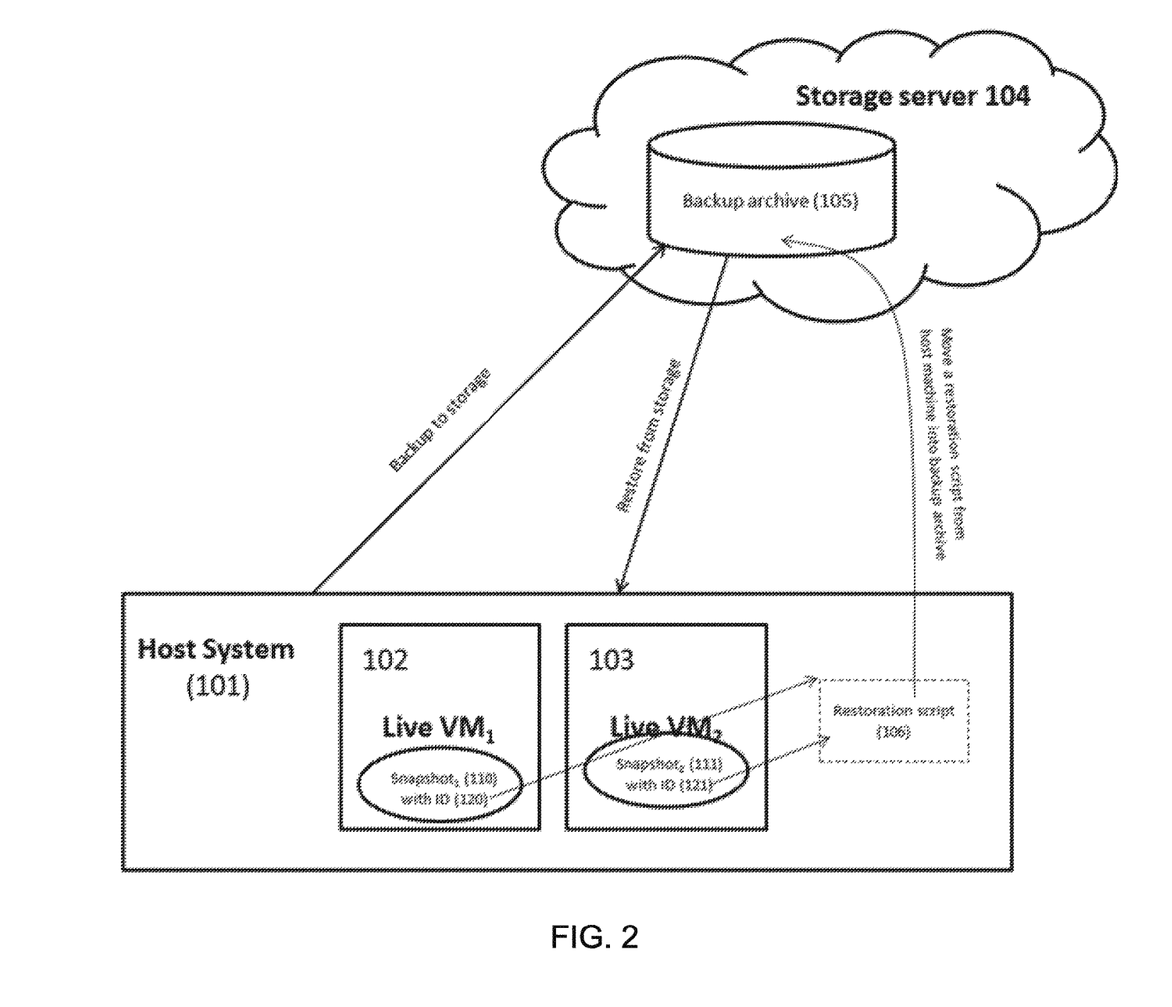
FIG. 2 depicts an example infrastructure in accordance with the present disclosure.

Referring now to FIG. 2, the computing site may include one or more virtualization host machines such as virtualization host system 101. Host system 101 may be a server computer on which a hypervisor runs one or more virtual machines (e.g., VMs 102 and 103). Host system 101 may be a host physical machine running or working under a Mac OS. In some systems, a host system may be an ESXi host and may run the VMware™ ESXi™ hypervisor. Host system 101 may use a cluster file system such as Virtual Machine File System (VMFS) or a Network File System (NFS).

Host system 101 may include or be in communication with one or more agents. For example, a backup agent may carry out one or more features of CC process 10. The Backup agent may include a software component, executable code, function, subroutine, or other set of instructions designed to carry out one or more operations for creating consistent copies of application data of one or more virtual machines running on host system 101.

One or more guest virtual machines may be hosted on host system 101. For example, VM1 (102) and VM2 (103) may be hosted on host system 101. A storage server (104) may be configured for storing a backup archive (105). Backup archive (105) may be stored on storage server (104). In an embodiment, VM snapshots (110), and (111) may be created with snapshots identifiers (IDs) (120) and (121). A restoration script (106) may also be created.

CC process 10 may receive a selection of a virtual machine to be backed up. CC process 10 may receive the selection of the virtual disk via the backup agent. The virtual machine to be backed up may be hosted by host system 101. Host system 101 may be a host physical machine running or working under a Mac OS which may host one or more virtual machines that at some point may need to be backed up. The indication of the virtual machine to be backed up may be received from, e.g., a user entering a command into a web interface at server computer 20 or one or more of client electronic devices 28, 30, 32, or 34. For example, one or more of users 44, 46, 48, and 50 may be system administrators of a cloud computing site and may wish to backup one or more virtual machines hosted by virtualization host device 200.

Figure 4:
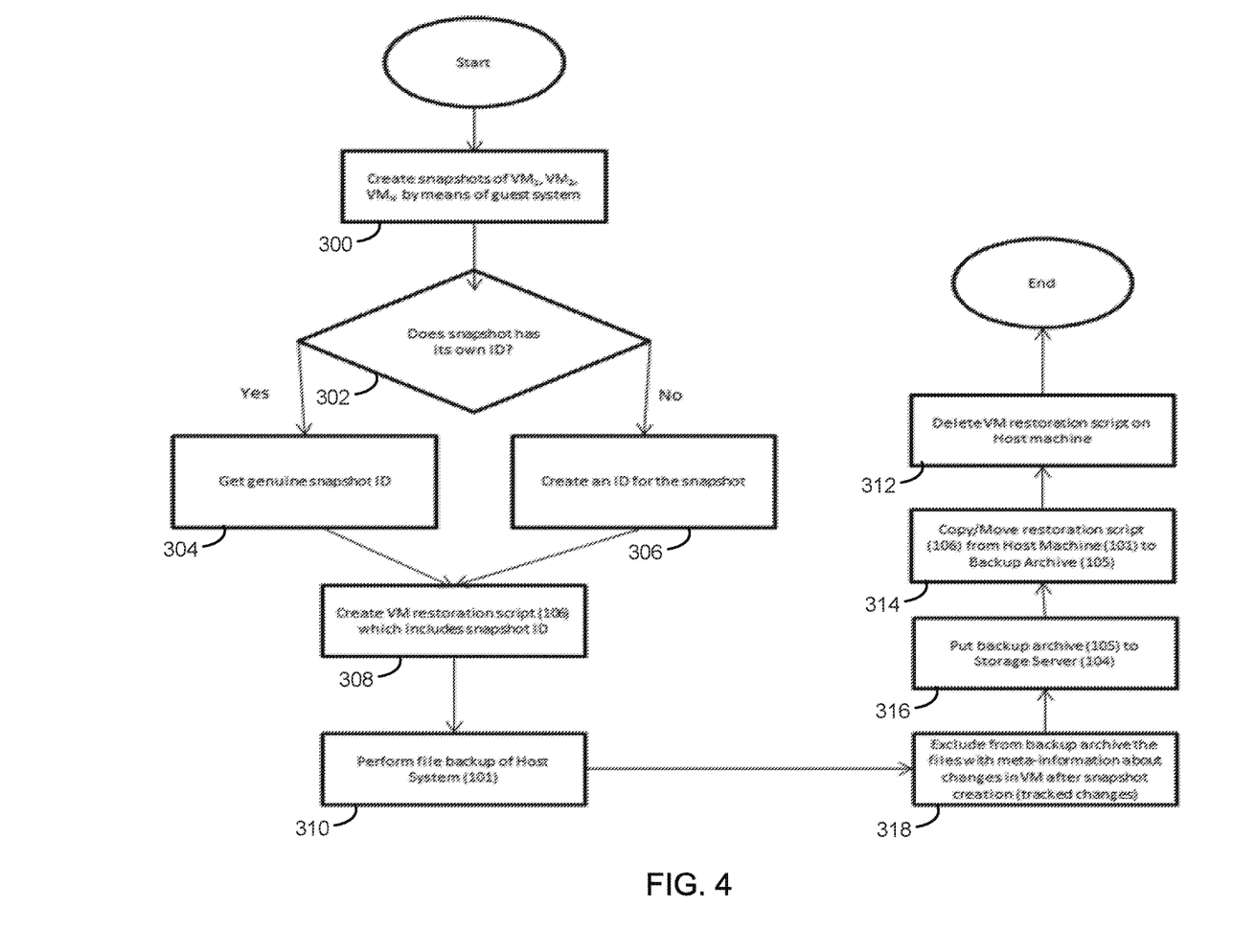
FIG. 4 is a flowchart illustrating an example process backup process in accordance with the present disclosure.

Referring now also to FIGS. 3 and 4, CC process 10 may create 200 a snapshot of a virtual machine running on a host system. For example, CC process 10 may create (300) snapshots (110) and (111) for virtual machines (102) and (103), which may run on host system/host machine (101). Snapshots (110) and (111) may be original snapshots of the virtual machines (102) and (103) which save the virtual machines (102) and (103) in a certain state.

Further CC process 10 may also determine 202 if the snapshot has a snapshot ID and may create the snapshot ID if the snapshot does not have the snapshot ID. If the snapshot has its own ID (302), CC process 10 may retrieve (304) the genuine snapshot ID (e.g., snapshot ID 120 or 121). If the snapshot does not have its own ID (302), CC process 10 may create (306) the snapshot ID. A snapshot ID may allow the choosing of this certain snapshot among several others. In an implementation, CC process 10 may want to choose the last snapshot.

CC process 10 may further create 204 (308) a virtual machine restoration script 106 configured to roll back the virtual machine to a state corresponding to the snapshot based on the snapshot ID (e.g., snapshot ID 120 or 121). The virtual machine restoration script 106 may include the snapshot ID (e.g., snapshot ID 120 or 121).

Further, CC process 10 may back up 206 the host system 101 in a backup archive 105 while the virtual machine (e.g., virtual machine 102 or 103) continues operating. A file backup of the host machine 101 may be performed (310). Operation of VM1 (102) and VM2 (103) may not be suspended during the backup. Because the virtual machines (102 and 103) may continue running or working during the backup, they write all changes occurring after snapshots (110 and 111, respectively) were created. For example, these changes are written by the virtual machines (102 and 103) to a service file. The name of the service file may vary depending on a virtual platform being used.

CC process 10 may also exclude 210 changes to the virtual machine (e.g., virtual machines 102 and 103), written to the service file during the backup of the host system 101 after the snapshot (e.g., snapshots 110 and 111) was created, from the backup archive. To ignore all the changes, these service files should be excluded (318) from the resulting archive, which may be done before backup (excluding rules) or after backup (deleting these files from the backup archive).

Moreover, CC process 10 may transfer 208 (316) the backup archive 105 to a storage server 104. Importantly, restoration script 106 may be coped or moved (314) from the host machine 101 to the backup archive 105. CC process 10 may then delete 212 (312) the virtual machine restoration script 106 from the host system 101. This may be done to avoid a snapshot roll-back in the current working environment.

Figure 5:
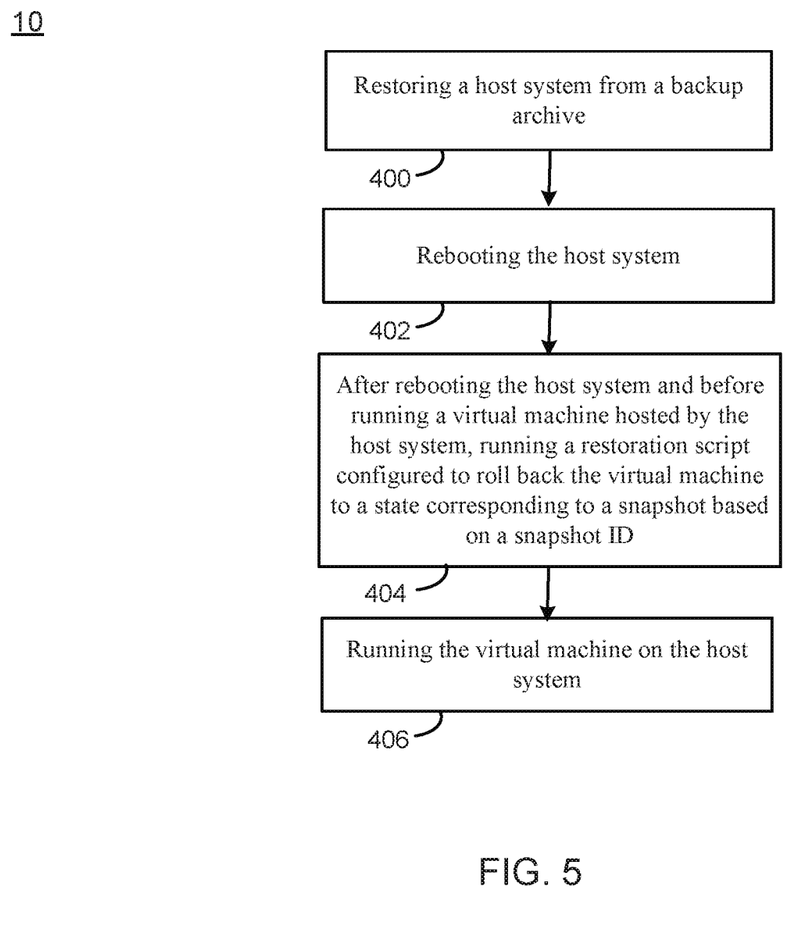
FIG. 5 is a flowchart illustrating an example process for restoring a virtual machine from a backup with consistent copies of application data in accordance with the present disclosure.
Figure 6:
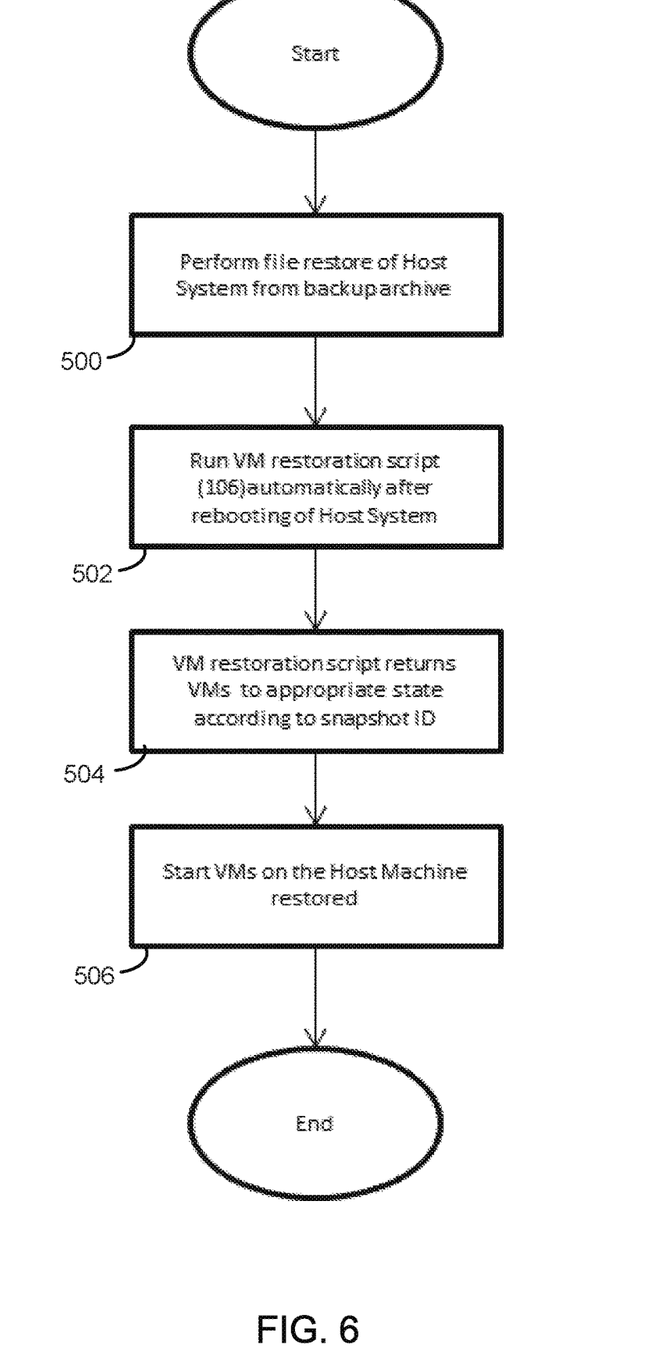
FIG. 6 is a flowchart illustrating an example restore process in accordance with the present disclosure.

In an implementation, CC process 10 may also execute a restore process to restore the virtual machines. Referring now to FIGS. 5 and 6, CC process 10 may restore 400 (500) the host system 101 from the backup archive 105. This may include the system files, user data, application data, etc. of the host system 101. The restoration may be performed by copying files from the backup archive (105). Further, process 10 may reboot 400 the host system 101. This may be done after the host system 101 is restored.

Further, after rebooting the host system 101 and before running a virtual machine (e.g., virtual machine 102 or 103) hosted by the host system 101, CC process 10 may run 404 the restoration script configured to roll back the virtual machine (e.g., virtual machines 102 and 103) to a state corresponding to a snapshot (e.g., snapshots 110 or 111) based on a snapshot ID (e.g., snapshot IDs 120 or 121). In an implementation, CC process 10 may run (502) the virtual machine restoration script 106 automatically after rebooting the host system 101.

CC process 10 may then run 406 (or start 506) the virtual machine (e.g., virtual machine 102 or 103) on the host system 101. The virtual machines may operate correctly because the meta-information which could be inconsistent was eliminated and the virtual machines could be returned to completely working states which were saved in snapshots (110 and 111). In other words, the virtual machine restoration script 106 returned (504) the virtual machines (e.g., virtual machine 102 or 103) to an appropriate state based on the snapshot ID (e.g., snapshot IDs 120 or 121).

The techniques and features of the present disclosure have been described herein with regard to virtual machines; however this is not intended to be a limitation of the present disclosure. For example, technology described herein may be applicable not only for virtual machines, but also for any other application which may create its own snapshots (e.g., databases, games, etc.).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or inter-network generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for backing up a virtual machine by creating consistent copies of application data, the method comprising:
   creating a snapshot of a virtual machine running on a host system, wherein the snapshot is created by the virtual machine, wherein the snapshot comprises state of the virtual machine;
   determining if the snapshot has a snapshot ID and creating the snapshot ID if the snapshot does not have the snapshot ID;
   creating a virtual machine restoration script configured to roll back the virtual machine to a state corresponding to the snapshot based on the snapshot ID;
   backing up the host system, using a backup system comprising one or more processors and one or more electronic memory devices, in a backup archive while the virtual machine continues operating, wherein a virtual machine backup file, a host system backup file, or backup contents are stored or located in the backup archive, the backup archive stored in the one or more electronic memory devices; and
   excluding changes to the virtual machine written to a service file during backup of the host system after the snapshot was created from the backup archive.

2. The method of claim 1, further comprising:
   transferring the backup archive to a storage server.

3. The method of claim 1, further comprising:
   deleting the virtual machine restoration script from the host system.

4. A computer program product residing on a non-transitory computer readable storage medium having a plurality of instructions stored thereon, which, when executed by a processor, cause the processor to perform operations for backing up a virtual machine by creating consistent copies of application data, the operations comprising:
   creating a snapshot of a virtual machine running on a host system;
   determining if the snapshot has a snapshot ID and creating the snapshot ID if the snapshot does not have the snapshot ID;
   creating a virtual machine restoration script configured to roll back the virtual machine to a state corresponding to the snapshot based on the snapshot ID;
   backing up the host system in a backup archive while the virtual machine continues operating, wherein a virtual machine backup file, a host system backup file, or backup contents are stored or located in the backup archive, the backup archive stored in one or more electronic memory devices; and
   excluding changes to the virtual machine written to a service file during backup of the host system after the snapshot was created from the backup archive.

5. The computer program product of claim 4, wherein the operations further comprise:
   transferring the backup archive to a storage server.

6. The computer program product of claim 4, wherein the operations further comprise:
   deleting the virtual machine restoration script from the host system.

7. A computing system for backing up a virtual machine by creating consistent copies of application data, the computing system comprising one or more processors and one or more electronic memory devices, wherein the one or more processors are configured to:
   create a snapshot of a virtual machine running on a host system, wherein the snapshot is created by the virtual machine, wherein the snapshot comprises state of the virtual machine;
   determine if the snapshot has a snapshot ID and creating the snapshot ID if the snapshot does not have the snapshot ID;
   create a virtual machine restoration script configured to roll back the virtual machine to a state corresponding to the snapshot based on the snapshot ID;
   back up the host system in a backup archive while the virtual machine continues operating, wherein a virtual machine backup file, a host system backup file, or backup contents are stored or located in the backup archive, the backup archive stored in the one or more electronic memory devices;
   transfer the backup archive to a storage server; and
   exclude changes to the virtual machine written to a service file during backup of the host system after the snapshot was created from the backup archive.

8. The computing system of claim 7, wherein the one or more processors are further configured to:

delete the virtual machine restoration script from the host system.

9. A method for restoring a virtual machine from a backup with consistent copies of application data, the method comprising:
- restoring a host system from a backup archive, the backup created by the host system, the backup archive stored at a storage server, wherein changes to a virtual machine written to a service file were excluded during backup of the host system after a snapshot was created from the backup archive;
- rebooting the host system;
- after rebooting the host system and before running the virtual machine hosted by the host system, running a restoration script configured to roll back the virtual machine to a state corresponding to the based on a snapshot ID, wherein the snapshot of the virtual machine was created by the virtual machine; and
- running the virtual machine on the host system.

10. A computing system for backing up and restoring a virtual machine by creating consistent copies of application data, the computing system comprising one or more processors and one or more electronic memory devices, the system comprising:
- a host system hosting a virtual machine;
- a snapshot of the virtual machine comprising state information, wherein the snapshot was created by the virtual machine;
- a host system backup file, wherein the host system backup file was created after the snapshot;
- a restoration script configured to roll back the virtual machine to a state corresponding to a snapshot based on a snapshot ID; and
- a backup archive at a storage server, wherein the snapshot, the host system backup file, or backup contents are stored or located in the backup archive, the backup archive stored in the one or more electronic memory devices, wherein the restoration script is transferred from the host system to the backup archive to avoid a snapshot rollback.

* * * * *